UNITED STATES PATENT OFFICE.

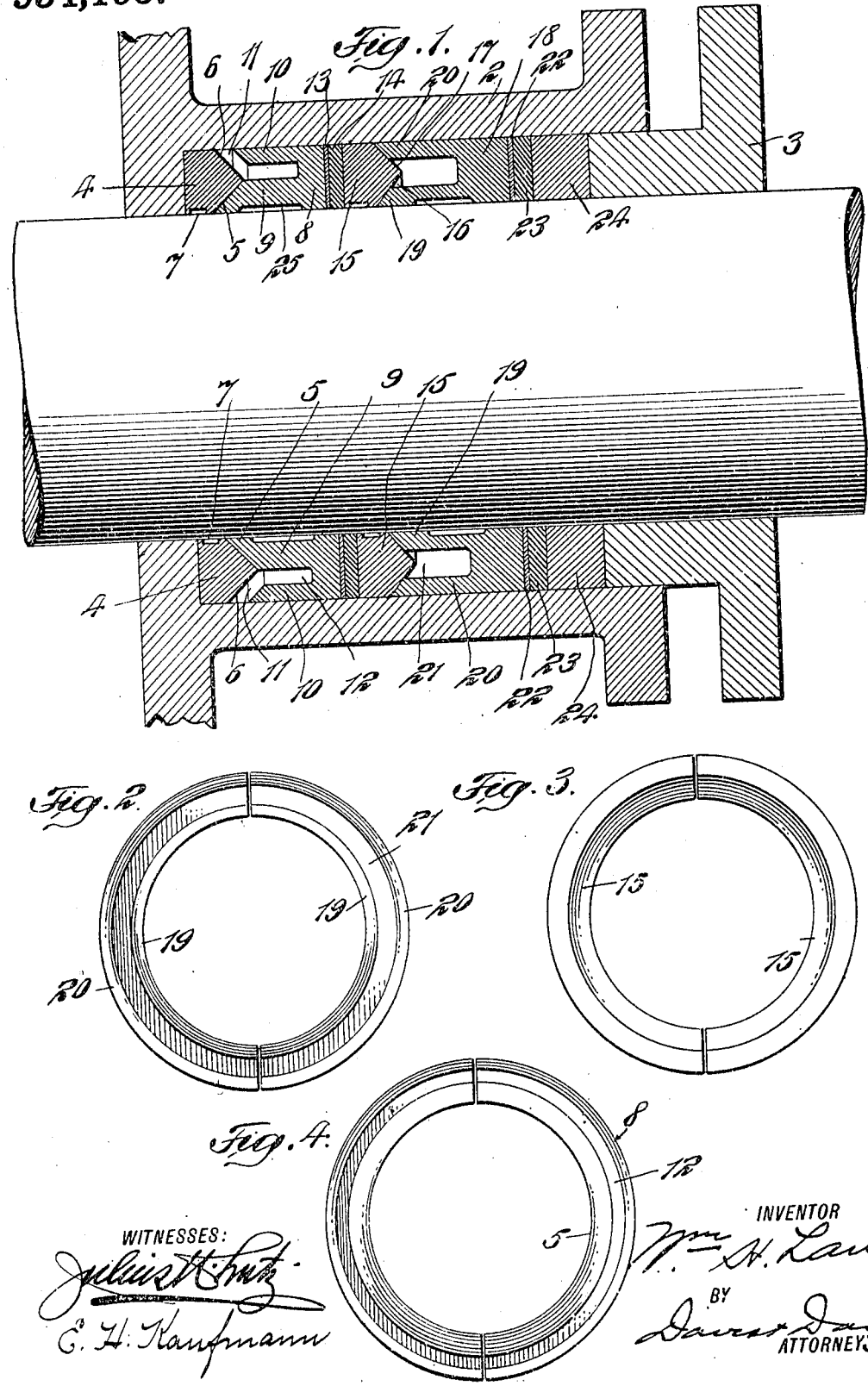

WILLIAM H. LAW, OF BROOKLYN, NEW YORK.

METALLIC PACKING.

954,195.  Specification of Letters Patent.  Patented Apr. 5, 1910.

Application filed September 2, 1909. Serial No. 515,877.

*To all whom it may concern:*

Be it known that I, WILLIAM H. LAW, a citizen of the United States, and resident of the borough of Brooklyn, county of Kings, and State of New York, have invented certain new and useful Improvements in Metallic Packing, of which the following is a specification, reference being had therein to the accompanying drawing, in which—

Figure 1 is a longitudinal sectional view of a stuffing box fitted with my improved packing; Fig. 2 a face view of one of the packing rings; Fig. 3 a face view of one of the wedge rings; and Fig. 4 a similar view of the other packing ring.

This invention relates to certain improvements in metallic packing for piston rods, valve rods, plungers and the like.

One of the main objects of the invention is to provide metallic packing rings of such construction as to insure an equal pressure against the wall of the stuffing box and against the plunger or valve rod or other reciprocating part moving through the stuffing box.

Another object of the invention is to so construct the packing rings that they may be easily manufactured and readily assembled within the stuffing box.

Other objects and advantages of my invention will appear hereinafter.

Referring to the various parts by numerals, 1 designates the piston rod or plunger; 2 the stuffing box containing the packing and through which the rod or plunger moves, and 3 the gland for compressing the packing. This gland may be adjusted inwardly by any suitable means to compress the packing and adjust it to the reciprocating part.

Within the stuffing box and bearing against the inner transverse wall thereof is a wedge ring 4. This ring fits squarely against the inner wall of the box, but its outer surface is tapered or oppositely beveled to form the two inclined wedge faces 5 and 6. The inclined face 5 extends inwardly toward the rod 1 and the face 6 extends outwardly to the side wall of the stuffing box. The wedge ring is formed with an annular groove 7 which serves as a receptacle for lubricant.

A packing ring 8 is arranged in the stuffing box next to the wedge ring 4 and is formed with the two annular flanges 9 and 10. The inner flange 9 is beveled to correspond with the face 5 of the wedge ring 4 and is in contact therewith. The outer flange 10 terminates short of the inclined face 6 of the wedge ring in order to leave the space 11 between said ring and the edge of said flange. Between the flanges 9 and 10 is formed a deep channel 12, which is in communication with the space or channel 11 between the flange 10 and the ring 4. The object of this channel is to permit an accumulation of the fluid which is under pressure, whereby said fluid will exert an equal pressure on the flange 9 and on the flange 10, thereby assisting in holding the flange 9 against the piston rod or plunger and the flange 10 against the wall of the stuffing box. By this means I provide for an equal expansion of the two flanges of the packing ring. The flange 9 will be positively forced inwardly by the contacting wedge face of the ring 4, the flange 10 being free to be expanded by the pressure of the fluid in the channel 12 and passage 11.

Bearing against the ring 8 are two thin packing washers 13 and 14; washer 13 being preferably of thin sheet brass and washer 14 being preferably of soft metal such as lead. The brass washer 13 fits tightly in the box and assists materially in preventing the passage of any fluid which may work its way past the packing ring 8. The washer 14 is slightly compressible so that it may be expanded to aid in preventing the fluid under pressure from passing outwardly through the stuffing box.

Fitting against the lead washer 14 is a second wedge ring 15 identical in shape with the wedge ring 4 and having the inclined faces 16 and 17. Arranged within the box adjoining the ring 15 is a packing ring 18 formed with the flanges 19 and 20, the deep channel 21 being formed between them. The inner edges of the flanges 19 and 20 are beveled to correspond with the inclined faces 16 and 17, the inner edge of flange 20 bearing on face 17 and the inner edge of flange 19 bearing on the inclined face 16 of the wedge ring 15. Arranged to bear against the outer edge of the ring 18 is a pair of thin packing washers 22 and 23. These washers correspond to washers 13 and 14 and are for the same purpose. Bearing against them is a compression ring 24 against which the gland 3 presses, this latter ring being of any suitable metal. By reason of the channel 21, the flange 19 may be readily moved inwardly against the plunger and the flange 20 may be readily moved outwardly against the wall of the stuffing box, by the wedge ring 15. It is also clear that the fluid under pressure may accumulate in said channel 21 and exert an equal pressure on the flanges 19 and 20. The inner surfaces of the packing rings 8 and 18 are formed with grooves 25 which act as lubricant-receiving channels and thereby reduce the friction of the plunger against said rings.

From the foregoing it is clear that the inward movement of the gland will force the inner flanges of the packing rings against the plunger. It is also clear that the fluid under pressure will accumulate in the channels 12 and 21 and exert a substantially equal pressure on the flanges of the packing rings. It is also clear that the flange 10 of the packing ring 8 will be free to adjust itself to the outer wall of the stuffing box and that the flange 9 will be free to adjust itself to the packing ring 4 and to the plunger 1 without regard to the position of the flange 10, for the reason that this latter flange does not contact with the wedge face 6 of the ring 4. This is important in that it insures the proper adjustment of the flange 9 and a close contact between the edge of said flange and the wedge face of the ring 4.

Having thus described my invention, what I claim as new and desire to secure by Letters Patent, is:—

1. A packing for stuffing boxes comprising a wedge ring having a wedge face inclining inwardly, a packing ring formed with an inner annular flange adapted to engage the reciprocating part to be packed and with an outer annular flange adapted to engage the wall of the stuffing box, an annular channel being formed between said flanges, the free edge of the inner flange being adapted to engage the inclined face of the wedge ring, a thin flat washer of hard metal arranged to bear on the packing ring, a flat washer of soft metal arranged to bear on the hard metal washer, a second wedge ring adapted to bear on said soft metal washer and provided on its opposite edge with an inclined wedge face, a second packing ring formed with an annular inner flange and a similar outer flange, the free edge of the inner flange being inclined to adapt it to engage the inclined wedge face of the adjoining wedge ring, a thin hard metal washer adapted to bear against the edge of the second packing ring, and a soft metal washer arranged to bear against the second hard metal washer.

2. A packing for stuffing boxes comprising a wedge ring having a wedge face inclining inwardly, a packing ring formed with an inner annular flange adapted to engage the reciprocating part to be packed and with an outer annular flange adapted to engage the wall of the stuffing box, an annular channel being formed between said flanges, the free edge of the inner flange being adapted to engage the inclined face of the wedge ring, a flat washer of hard metal arranged to bear on the packing ring, a flat washer of soft metal arranged to bear on the hard metal washer, a second wedge ring adapted to bear on said soft metal washer and provided on its opposite edge with an inclined wedge face, a second packing ring formed with an annular inner flange and a similar outer flange, the free edge of the inner flange being inclined to adapt it to engage the inclined wedge face of the adjoining wedge ring.

3. A packing for stuffing boxes comprising a wedge ring having a wedge face inclining inwardly, a packing ring formed with an inner annular flange adapted to engage the reciprocating part to be packed and with an outer annular flange adapted to engage the wall of the stuffing box, an annular channel being formed between said flanges, the free edge of the inner flange being adapted to engage the inclined face of the wedge ring, a thin flat washer of hard metal arranged to bear on the packing ring, a flat washer of soft metal arranged to bear on the hard metal washer, a second wedge ring adapted to bear on said soft metal washer and provided on its opposite edge with an inclined wedge face, a second packing ring formed with an annular inner flange and a similar outer flange, the free edge of the inner flange being inclined to adapt it to engage the inclined wedge face of the adjoining wedge ring, each of the packing rings being formed with an annular lubricant-receiving channel in the inner face of the inner flange.

4. A packing for stuffing boxes comprising a wedge ring having a wedge face inclining inwardly, a packing ring formed with an inner annular flange adapted to engage the reciprocating part to be packed and with an outer annular flange adapted to engage the wall of the stuffing box, an annular channel being formed between said flanges, the free edge of the inner flange being adapted to engage the inclined face of the wedge ring, a flat washer of hard metal arranged to bear on the packing ring, a flat washer of soft metal arranged to bear on the hard metal washer, a second wedge ring adapted to bear on the soft metal washer and provided on its opposite edge with an inclined wedge face, a second packing ring formed with an annular inner flange and a similar outer flange, the free edge of the inner flange being inclined to adapt it to engage the inclined wedge face of the adjoining wedge ring, each of the packing rings being formed with an annular lubricant-receiving channel in the inner face of the inner flange, and each wedge ring being formed with an annular lubricant-receiving channel in its inner surface.

5. A packing for stuffing boxes comprising a wedge ring having a wedge face inclining inwardly, a packing ring formed with an inner annular flange adapted to engage the reciprocating part to be packed and with an outer annular flange adapted to engage the wall of the stuffing box, an annular channel being formed between said flanges, the free edge of the inner flange being adapted to engage the inclined face of the wedge ring, a second wedge ring provided with an inclined wedge face, and a second packing ring formed with an annular inner flange and a similar outer flange, the free edge of the inner flange being inclined to adapt it to engage the inclined wedge face of the adjoining wedge ring.

In testimony whereof I hereunto affix my signature in the presence of two witnesses this 27th day of August 1909.

WILLIAM H. LAW.

Witnesses:
   WM. R. DAVIS,
   E. H. KAUFMANN.